(12) United States Patent
Amend (10) Patent No.: US 12,329,179 B2
(45) Date of Patent: Jun. 17, 2025

(54) PROCESS AND DEVICE FOR APPLICATION OF PARTICLES ONTO FROZEN CONFECTIONERY

(71) Applicant: SOCIETE DES PRODUITS NESTLE S.A., Vevey (CH)

(72) Inventor: Thomas Aloisius Valentinus Amend, Bakersfield, CA (US)

(73) Assignee: Societe des Produits Nestle S.A., Vevey (CH)

( * ) Notice: Subject to any disclaimer, the term of this patent is extended or adjusted under 35 U.S.C. 154(b) by 595 days.

(21) Appl. No.: 17/756,916

(22) PCT Filed: Sep. 24, 2020

(86) PCT No.: PCT/EP2020/076764
§ 371 (c)(1),
(2) Date: Jun. 6, 2022

(87) PCT Pub. No.: WO2021/058668
PCT Pub. Date: Apr. 1, 2021

(65) Prior Publication Data
US 2023/0015815 A1    Jan. 19, 2023

Related U.S. Application Data

(60) Provisional application No. 62/906,923, filed on Sep. 27, 2019.

(51) Int. Cl.
*A23G 9/24* (2006.01)
*A23G 9/26* (2006.01)
(Continued)

(52) U.S. Cl.
CPC ............... *A23G 9/245* (2013.01); *A23G 9/26* (2013.01); *A23G 9/48* (2013.01); *A23G 9/503* (2013.01)

(58) Field of Classification Search
CPC ... A23G 9/24; A23G 9/26; A23G 9/48; A23G 9/50
See application file for complete search history.

(56) References Cited

U.S. PATENT DOCUMENTS 3,648,625 A    3/1972 Glass
4,189,289 A *  2/1980 Getman ................. A23G 9/245
                                                  425/93

(Continued)

FOREIGN PATENT DOCUMENTS

CN    101170908 A    4/2008
CN    101433257 A    5/2009
(Continued)

OTHER PUBLICATIONS

Chinese Office Action for Appl No. 202080013674.9 dated Jul. 19, 2023.

*Primary Examiner* — Anthony J Weier
(74) *Attorney, Agent, or Firm* — K&L Gates LLP (57) ABSTRACT

The invention relates to an apparatus for decorating frozen confectionery on sticks, the apparatus having: a coating station for applying coating material onto the frozen confectionery, a particle dispensing station for applying particles onto the coated frozen confectionery, a conveyor for moving the frozen confectionery past the coating station and the particle dispensing station, the conveyor having gripping means arranged on the conveyor and having a product attached position and an opened position for gripping and releasing the stick of the frozen confectionery, and the conveyor has guides for moving gripping means with the frozen confectionery between a vertical position and a horizontal position. The apparatus further includes coating removal means for removing coating material on one side of the frozen confectionery, which coating removal means are positioned after the coating station in the direction of the (Continued)

movement of the conveyor, and wherein the particle dispensing station is positioned after the coating removal means, and wherein the gripping means are arranged to hold the frozen confectionery in the horizontal position when passing particle dispensing station. The invention also relates to a method for manufacturing decorated frozen confectionery on sticks making use of the apparatus.

17 Claims, 5 Drawing Sheets

(51) Int. Cl.
*A23G 9/48* (2006.01)
*A23G 9/50* (2006.01)

(56) References Cited

U.S. PATENT DOCUMENTS

2015/0327571 A1* 11/2015 Amend ............... A23G 9/14
                                                                                                        426/66
2024/0049743 A1* 2/2024 Amend ............... A23G 9/26

FOREIGN PATENT DOCUMENTS

| CN | 102264239 A | 11/2011 |
|---|---|---|
| CN | 107148222 A | 9/2017 |
| EP | 2308319 | 4/2011 |
| GB | 301911 | 8/1929 |

* cited by examiner

PROCESS AND DEVICE FOR APPLICATION OF PARTICLES ONTO FROZEN CONFECTIONERY

CROSS REFERENCE TO RELATED APPLICATIONS

The present application is a National Stage of International Application No. PCT/EP2020/076764, filed on Sep. 24, 2020, which claims priority to U.S. Provisional Patent Application No. 62/906,923, filed on Sep. 27, 2019, the entire contents of which are being incorporated herein by reference.

FIELD OF THE INVENTION

The present invention relates to an apparatus for decorating frozen confectionery on sticks and a method for manufacturing the frozen confectionery.

BACKGROUND

Coated frozen confectionery are products, which are highly appreciated by consumers. An elegant and artisanal look further enhances the indulgence of the products beyond the contribution coming from the ingredients used and the texture.

Manually decorated products, i.e. products with particles applied onto ice cream bars, to create artisanal, individualized products are particular popular with consumers. Such products may be prepared by a process where either the consumer or an employee of an ice cream store customise the ice creams with a choice of toppings and dips. In this process uncoated ice cream bars are dipped into liquid coating material. Immediately after coating, particles are sprinkled onto the coating, while the coating is still liquid. After a few seconds, the coating solidifies and the embedded particles become fixed in place. This ensures that the particles do not fall off when the product is consumed. The type of particles may be nuts, cookie pieces, rice crispies, fruits, flower petals, chocolate bits or any other edible particulates. The weight, size and shape of the particles may vary. Furthermore, frequently, a small amount of liquid chocolate is drizzled in the form of lines over the product after adding the particles.

For this manual process, both frozen confectionery bars from an extrusion process and bars from a molding process, can be used. However, bars manufactured in an extrusion process are more frequently used due to their generally better textural quality. Ice cream parlors selling such freshly coated products exist.

Unfortunately, there is no equivalent process available in industrial ice cream manufacturing that would replicate that manual procedure.

An alternative way to make frozen confectionery bars that exhibit some of the characteristics of the aforementioned manually decorated products is used by Seika Foods (Japan). It involves filling liquid or partially frozen confectionery mix into a plastic tray with the shape of the finished product. On top of this layer, particles are added, possibly complemented by sauces, fruit pieces, and decorations. After final freezing, the product, including the tray, is wrapped in a plastic pouch for distribution and sale. While this process allows to add a variety of particles onto one side of the product, similar to the above mentioned manually decorated bars, these products have no enrobing on the ice cream part, hence they do not fully replicate the appearance of the manually decorated bars.

The challenge of replicating manually decorated bars is explained in the following description of existing procedures of applying a liquid coating material and particles onto ice cream bars: In industrial ice cream manufacturing, bars of frozen dessert, which are coated and which include particles on their surface, are well known for a long time. Two types of processes are typically used in the manufacturing of such products. In a first process, the frozen dessert bar is dipped into a liquid coating wherein the particles are suspended (C. Clark, The Science of ice Cream, RSC Paperbacks, 2005, page 94 f). Various particles may be used, such as nuts. The particles need to be kept suspended and evenly distributed in the coating during the process. During dipping, the coating and the particles adhere to the surface of the frozen dessert bar and are fixed as the coating solidifies. It is important that the particles do not fall off but remain adhered to the product surface until the coating is solidified. The choice of particles is therefore limited to those which are not too heavy. Another characteristic of this method is that the particles are covered with coating so that details of their shape and color are at least partially masked.

In a second process of applying particles, called dry coating, particles are attached to the surface of the coating material right after dipping and before the coating solidifies. During this process, the frozen dessert bars are first dipped into a coating material, immediately followed by projecting the particles against the surface. In a typical dry coating process, the dipped bars are lowered into an equipment called dry coater. In that machine, rotating paddles throw the dry particles against the still sticky product surface (C. Clark, The Science of ice Cream, RSC Paperbacks, 2005, page 98). The particles suitable for dry coating have to be carefully selected, since particles too heavy will fall off from the vertical surface. Hence, there is a limitation regarding the particles that can be attached.

Both of the existing processes of adding particles onto the bars thus have limitations regarding the choice and visibility of particles, which clearly distinguish them from the above-mentioned manually coated bars.

There is therefore a need to for an industrial method for manufacturing frozen confection, which provides the visual appearance of manually decorated products, and without the limitations inherent to the industrially used coating procedures discussed above.

OBJECT OF THE INVENTION

It is the object of present invention to provide an apparatus and method for coating of frozen confectionery for an artisanal appearance. Furthermore, it is an objective to minimize waste of particles and coating material in the method.

SUMMARY OF THE INVENTION

In a first aspect, the invention relates to an apparatus for decorating frozen confectionery on sticks, the apparatus comprising:
- a coating station for applying coating material onto the frozen confectionery,
- a particle dispensing station for applying particles onto the coated frozen confectionery,
- a conveyor for moving the frozen confectionery past the coating station and the particle dispensing station, the conveyor comprising gripping means arranged on the conveyor and having a product attached position and an opened position for gripping and releasing the stick of the frozen confectionery, the conveyor comprises guides for moving gripping means with the frozen confectionery between a vertical position and a horizontal position, and wherein the apparatus further comprises coating removal means for removing coating material on one side of the frozen confectionery, which coating removal means are positioned after the coating station in the direction of the movement of the conveyor, and wherein the particle dispensing station is positioned after the coating removal means, and wherein the gripping means are arranged to hold the frozen confectionery in the horizontal position when passing particle dispensing station.

In a second aspect, the invention relates to a method for manufacturing decorated frozen confectionery on sticks, the method comprising:

providing an apparatus according to claims 1 to 12,
attaching the frozen confectionery by the stick with the gripping means on the conveyor,
moving the frozen confectionery past the coating station while applying a coating,
bringing the frozen confectionery to a horizontal position,
removing liquid coating with the coating removal means from one side of the frozen confectionery,
moving the frozen confectionery past the particle dispensing station while adding particles to the upper surface of the frozen confectionery,
cooling and
releasing gripping means and the decorated frozen confectionery.

The present invention overcomes the limitations of existing procedures of applying coating and particles by providing a coating removal step, avoiding the coating material agglomerating the particles while allowing the particles to be well embedded into and/or attached to the coating.

The apparatus and the method according to the invention allows the creation of frozen confectionery products, comparable to a manually decorated frozen dessert bar, on an industrial production line. In particular, the process of the invention can be made on a standard ice cream extrusion line, widely used in industry, to create extruded bars with a coating, as e.g. described in "H. D. Goff and R. W. Hartel—Ice Cream, Seventh Edition, Springer, 2013, page 277 ff.

DETAILED DESCRIPTION OF THE INVENTION

The invention relates to an apparatus for decorating frozen confectionery on stick. The apparatus comprising: a coating station for applying coating material onto the frozen confectionery, a particle dispensing station for applying particles onto the coated frozen confectionery, and a conveyor for moving the frozen confectionery past the coating station and the particle dispensing station. The conveyor comprising gripping means arranged on the conveyor and having a product attached position and an opened position for gripping and releasing the stick of the frozen confectionery. The gripping means are preferably arranged perpendicular to the direction of the movement of the conveyor. The conveyor comprises guides for moving gripping means with the frozen confectionery between a vertical position and a horizontal position. This allows the frozen confectionery to be moved in and out of the stations. For example, the frozen confectionery can be held vertically and moved into and out of a coating bath. The apparatus further comprises coating removal means for removing coating material from the underside of the frozen confectionery, which coating removal means are positioned after the coating station. The positon of the coating removal means is preferably beside or beneath the conveyor in the direction of the movement of the conveyor. This has the effect that the amount of coating material, which drips from the frozen confectionery and into collection hopper of the particle supply system for particles, can be greatly reduced or eliminated. This means that lumping of the particles, due to coating material making the particles stick together, can be avoided, and the particles re-used in the manufacturing process.

The coating station may be adapted to apply the coating by dipping, spraying or showering. In a preferred embodiment, the coating station is a dipping station.

The apparatus further has a particle dispensing station, which is positioned above the conveyor and after the coating removal means. The gripping means are arranged to hold the frozen confectionery in the horizontal position when passing the particle dispensing station. Guides are used to move the grippers with the products between a vertical and a horizontal position. The effect of this is that pieces can be applied to the frozen confectionery's coated upper side (with the dispenser above, only the upper side is sprinkled with particles), while the coating is still sufficiently soft so that the particles will adhere to the coating. It is preferred that the gripping means hold the frozen confectionery in a horizontal position when the conveyor passes the particle dispensing station in order for the particles to land on the upper horizontal side of the frozen confection.

In the present context, particles may be any kind of food particles or pieces thereof e.g. nuts, cookie pieces, rice crispies, fruits, flower petals, chocolate bits or any other edible particulate material. The weight, size and shape of the particles may vary. The invention is particular useful for dosing bigger particles such as whole nuts or berries. The size of the particles are preferably in the range of 2 -20 mm, more preferably in the range of 5-15 mm, the size being the longest dimension of the particle. However, bigger particles may also be applied.

In a preferred embodiment of the apparatus according to the invention, the coating removal means provide an airflow adapted to partially remove coating material, which may otherwise drip from the frozen confectionery. Only the outer layer of the coating which is not yet solidified is removed from the frozen confectionery, and preferably only from one side of the product.

The coating removal means has been found to greatly reduce or eliminate coating from dripping into the particle supply system and causing lumping of the particles. The coating removing means may consist of one or more air knives or other nozzle arrangements which create an air curtain suitable to remove the liquid coating. Another coating removal means may be a mechanical scraper, arranged so that the frozen confectionery passes over that mechanical scraper in a way to remove liquid coating without damaging solidified parts of the coating and without damaging the frozen confectionery.

When an airflow is used for removing the excess coating material, splashing of coating material during blowing is preferably contained by a shield surrounding the air knife. It is furthermore preferred to warm the shield and/or the air blow nozzle to prevent coating from building up on it.

Preferably, and based upon a top down view onto the bar, the air knife, knives and/or air curtain created from a slit-nozzle or a row of nozzle holes are positioned perpendicular to the direction of the conveyor movement of the product or with an angle of up to 60 degrees to either side measured from the position perpendicular to the direction of the movement of the products.

Preferably, the air flow means is positioned so that the air flow points vertically straight up onto the underside of the product or with an angle preferably of up to 45 degrees from the vertical position to either side of the product, more preferably with an angle of up to 20 degrees into the direction opposite to the conveyor movement of the product.

Further, and viewed from a horizontal view towards the tip of the product, the air knife and/or air curtain created from a slit nozzle or row of nozzle holes is positioned so that the air stream points vertically straight up onto the underside of the product or with an angle preferably of up to 45 degrees from the vertical position to either side, more preferably with an angle of up to 20 degrees into the direction opposite to the conveyor movement of the product.

While it is preferred to apply the airflow while the product is in a horizontal position, it is also possible to apply the airflow while the product is in the vertical position. In that case, the product is lowered to a vertical position after dipping into coating, in which position it passes by a vertically oriented airflow, which removes the liquid coating. After this step, the product is again raised to horizontal position for applying the particles.

The use of air blowing to partially remove coating from one side of the bar may leave a pattern, similar to a fine wavy structure imprinted on the coating. If a scraper blade is used to remove excess chocolate, scratch marks are visible on the coating, running perpendicular to the axis of the stick.

Advantageously, the airflow comes from air nozzles or an air knife, which are positioned beneath bars when held in their horizontal position. The airflow is preferably continuously blowing away coating material from the underside of the bar while leaving the already solidified part of the coating on the underside of the bar.

The airflow from the coating removal means airflow may be heated by means of a heating device. The advantage of this heating is to prevent build-up of coating material on the air knife or air nozzle, since coating dripping on the air knife or air nozzle will remain liquid and drip off.

In one embodiment of the invention, the apparatus comprises coating removal means in the form of a mechanical scraper. The scraper removes partly coating from the underside and stops dripping at least temporarily. This is achieved by installing it beneath the ice cream bars in such a way that liquid coating is scraped off the bar when the bars pass by. Preferably the mechanical scraper is a static bar or blade. Since scraping takes off a considerable amount of coating from the bar, there is only little or no residual dripping, and about 1 second after scraping, there is no dripping at all, and this period of time can be used to apply the particles.

The particle dispensing station comprises a particle dispensing device and a particle dispensing hopper, for dispensing particles onto the frozen confectionery. The dispensing device can be a vibrating doser or a screw feeder or bowl feeder or any other device that provides a constant stream of particles.

The apparatus may also further comprises a particle supply system for collecting particles not attached to the frozen confectionery coating and conveying means to return collected particles back to the dispensing station. According to the invention, the collected particles may be re-used in the manufacturing process. The particle supply system e.g. comprising a hopper is installed beneath the outlet of the particles dispenser and beneath the product path.

The apparatus may also comprise means for collecting removed or dripped coating material. For example, a drip pan for collecting the removed or dripped coating material may be used.

Furthermore, the apparatus may comprise a coating line applicator, preferably positioned after the particle dispenser in the direction of the movement of the conveyor. The line applicator provides decorative lines to the products, which in addition to the decoration effect may also help to fix particles.

In a preferred embodiment of the apparatus according to the invention, the apparatus further comprises a coating lines applicator to apply decorative coating lines, typical for handmade products subject of this invention, on top of the particles on the bar.

The coating lines applicator is preferably positioned after the particle dispenser in the direction of the movement of the conveyor. Application of these lines is done after particles were sprinkled and with the bars still in a horizontal position. The coating lines preferably have a diameter of 1-5 mm thickness. Applicators for coating lines onto products positioned horizontally are well known and the principle is described e.g. in U.S. Pat. No. 3,824,950.

The benefit of the coating lines is primarily their decorative element, but they also help to fix loose particles on the bar.

Drawings

The invention is now further described with reference to the drawings by way of example only.

The method of creating the frozen confectionery starts by providing uncoated bars with a wooden stick inserted. Firstly, frozen confectionery from a freezer is extruded through a nozzle. During this step, sticks are inserted, then slabs of frozen confectionery are cut off using a hot wire. The frozen confectionery slabs fall onto a conveyor belt which travels through a hardening tunnel, to freeze the frozen confection. At the exit of the tunnel, the hard frozen products are picked up from the belt by grippers holding them by the sticks.

For the subsequent steps of the method of invention, preferably a single-lane extrusion line may be used. It is a line widely used in ice cream manufacturing.

Figure 1:
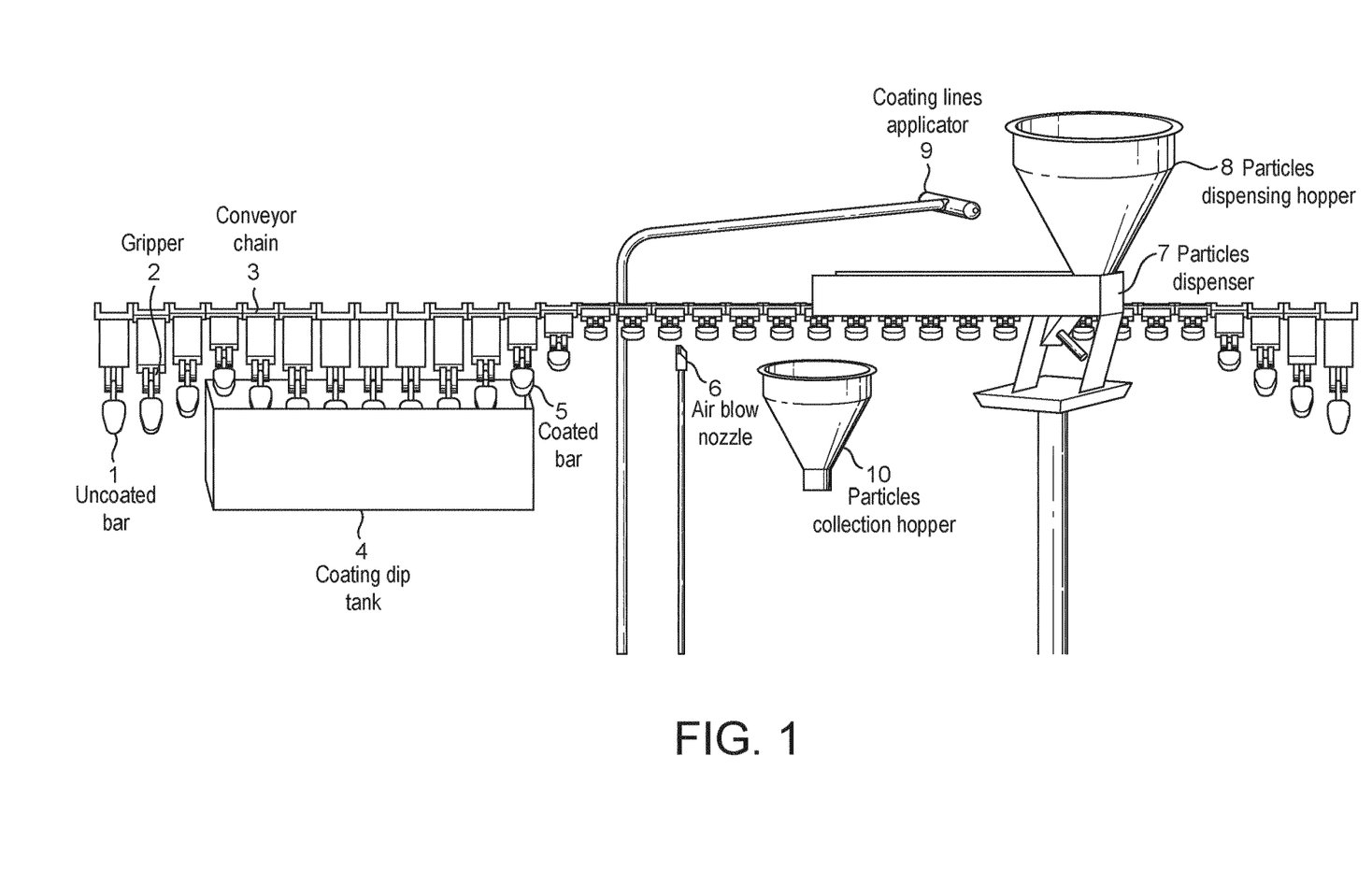
FIG. 1 illustrates a layout of an embodiment of the apparatus of the present invention and the method of applying particles onto one side of a frozen dessert bar.

FIG. 1 shows, in a principle drawing, the apparatus and method according to the invention from this point forward on a single lane extrusion line. At this line, the grippers (2) with the uncoated frozen confectionery bar (1) suspended therefrom are fixed along an endless conveyor chain (3) that continually conveys the products to subsequent process steps.

The frozen confectionery products which are vertically suspended from the grippers, are conveyed towards the coating dip tank (4). To enter the coating dip tank, guide bars installed below the grippers push the grippers (2) up towards a horizontal or near horizontal position. Once raised over the rim of the dip tank, the grippers are lowered to fully immerse the bars (1) into the coating. Then the grippers (2) are again pushed up vertically to exit the dip tank (4).

In a standard industrial process, the bars are then lowered back down to a vertical position and excess coating drips or runs off the coated bars. The dripping may continue for about 10 to 30 seconds until the coating solidifies. The time of dripping is known to depend on various factors, with the most important being the coating composition and temperature and the frozen confectionery temperature.

In the process subject of this invention, the bar is kept in a horizontal position after dipping by means of support bars holding the grippers. At this point, there is still excess coating dripping off the coated confectionery bars (5). To stop dripping, air blow nozzle (6) placed beneath the products, removes the unsolidified portion of the coating from the underside. Right after the air blow nozzle, the particles dispenser (7) sprinkles particles, supplied from the particles dispensing hopper (8) onto the bar. Particles not landing on the products are collected by the particles collection hopper (10) which is part of a particle supply system and returned into the particles dispensing hopper (8) by appropriate conveyor means known in industry.

In the next step, the products pass by under a coating lines applicator (9) which provides a series of about 3 to 20 lines of coating material onto the particulates layer. The product is then kept in a horizontal position for about 1 to 10 more seconds, then lowered to a vertical position and finally conveyed to the wrapping station.

Figure 2A:
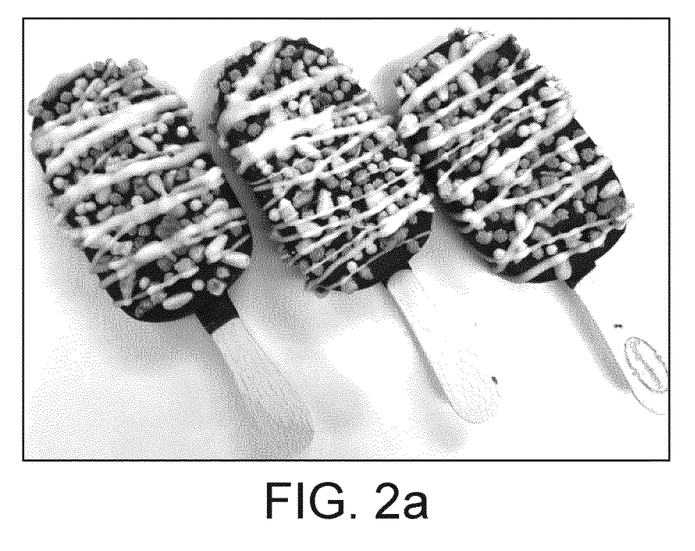
FIG. 2a is a picture of finished ice cream bars with a coating, application of particles on one side and drizzle of coating lines, obtained with the apparatus and method of the invention.
Figure 2B:
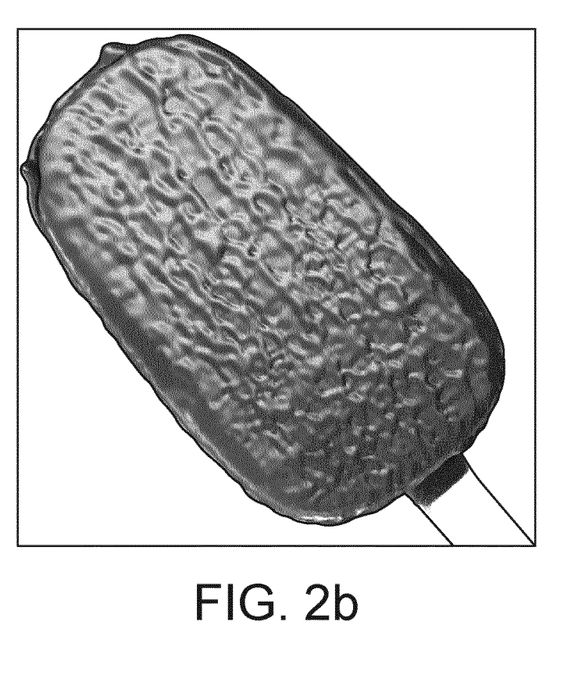
FIG. 2b shows a typical wave pattern on the coating subjected to an air blowing step by an air knife.

FIG. 2a shows the final bars, displaying coating, particulates and coating lines. FIG. 2b.

Figure 3:
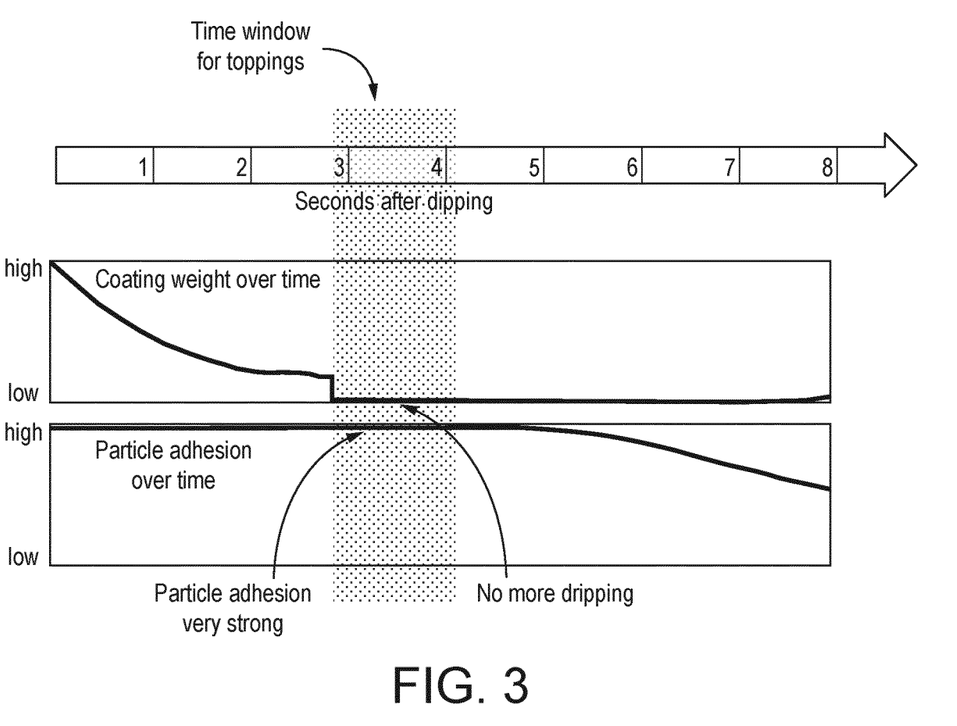
FIG. 3 is a chart showing changes of the coating weight and of the particle adhesion over time in seconds after the dipping of an ice cream stick.

FIG. 3 shows the action of an airknife blowing off part of the coating from the underside of a coated bar. The bar moves past the airknife from the left to the right.

EXAMPLES

Example 1—Dripping of Coating at Different Times after Dipping

Table 1, Column 1, demonstrates the progression of dripping of coating from a bar held in horizontal position after the coating step. An extruded ice cream bar with a weight of 56 g is coated in a chocolate coating. The coating has a 48% fat content and a fat composition of 50% cocoa butter and 50% coconut oil. The coating has a temperature of 41 degrees Celsius. The ice cream has a temperature of −25 degrees Celsius. The bar is dipped into the coating for 1 sec, then removed and brought to a horizontal position. The weight of the coating remaining on the bar at different times is recorded.

TABLE 1

| Time (sec) after removing bar from coating | Column 1 Weight of coating on the bar (g) - only dipping | Column 2 Weight of coating on the bar (g) - with air blow at 2.7 sec |
| --- | --- | --- |
| 0 | 31.0 | 31.0 |
| 1.9 | 24.2 | 24.2 |
| 2.7 | 22.4 | 18.3 |
| 3.7 | 21.7 | 18.3 |
| 4.1 | 21.6 | 18.3 |
| 7.8 | 21.2 | 18.1* |
| 9.2 | 21.0* | 18.1 |

*Last drop

Right after dipping, before significant dripping has occurred, the weight of the coating on the bar is 31 g. Over the following seconds, the weight of the coating decreases as part of it drips off. During the first 2-3 seconds, dripping is strongest, then eases. The last drop falls off after 9.2 sec.

In order to reduce the dripping of coating into the particles supply system, it is preferred to apply particles to the bar after dripping has ceased after 9.2 sec, however, before the coating on the upper side has solidified.

Therefore, the solidification, and in particular the adhesion properties of particles on the bar are of interest. Good adhesion is important to prevent particles coming off during the wrapping step and during product handling in the distribution chain.

Example 2—Adhesion Properties at Different Times

Table 2 describes the adhesion of particles applied on the upper side of the bar at different times. In particular, it describes the adhesion properties of spherical rice crispies covered with a fat-based coating and a diameter of 5 mm, sprinkled onto the horizontal bar by a vibratory dispenser from a height of 10 cm at different times after the bars are lifted out of the dip tank.

All the particles which were sprinkled 4 seconds after removal of the bar from the dip tank are partially immersed in the coating layer to an equal depth. They cannot be easily removed when rubbing over them by hand after a 5 min waiting time after application. When sprinkling particles 6 seconds after removing the bar from the dip tank, the particles still resist rubbing by hand. However, particles located on the bar close to the edge where the wooden stick is inserted, are visibly less deep immersed into the coating layer compared to particles in the middle of the bar and near the tip of the bar. The particles still do not come off when rubbing over the bar by hand.

TABLE 2

| Time until particles application (sec) | Observed adhesion properties |
| --- | --- |
| 4 | All particles resist to rubbing. Immersion depth of particles is the same all over the surface of the bar. |
| 6 | All particles resist to rubbing, but immersion of particles less deep near the stick compared to near the tip. |

TABLE 2-continued

| Time until particles application (sec) | Observed adhesion properties |
|---|---|
| 9 | 4-5 pieces of particles near the stick easily fall off during rubbing. Those particles have barely immersed into the coating compared to those near the tip. |
| 14 | 15-20 pieces of particles near the stick easily fall off during rubbing. Those particles have barely immersed into the coating compared to those near the tip. |
| 24 | No particles adhering near the stick, all other particles fall off easily during rubbing. Immersion depth of the adhering particles was visibly low. |

After 9 seconds after sprinkling, when rubbing over the product, some particles located in the area of the bar next to the wooden stick came off easily. They have been barely immersed into the coating.

Table 2 shows the two adhesion parameters at different times after the products were removed from the dip tank.

After 14 seconds, more particles came off easily during rubbing. After 24 seconds, particles near the stick did not adhere to the coating at all, all other particles come off easily when rubbing. It was found that particles should be sprinkled preferably before 9 seconds after the product has been removed from the dip tank in order to have good adhesion to the bar.

Examples 1 and 2 indicate that there is no suitable time during the process allowing to achieve both good adhesion as well as a minimal or no drip of coating into the particle collection hopper.

Figure 4:
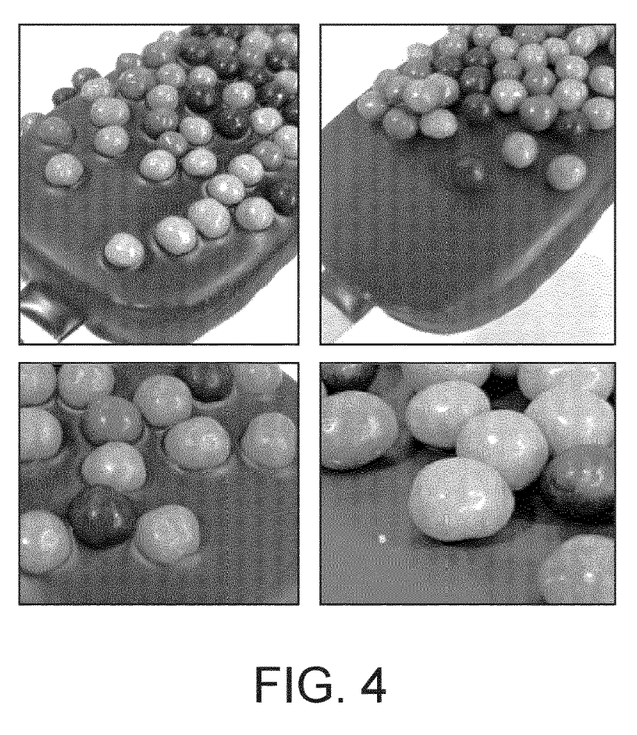
FIG. 4 shows a comparison between particles well adhering and embedded in the coating layer (left) and particles loosely adhering to the coating layer (right).

FIG. 4 is a chart showing the difference between particles sprinkled at different times after dipping of the ice cream stick. The different level of embedding is clearly visible. The figure shows the comparison between low and strong adhesion of the particles. The particles on the left, sprinkled 5 seconds after the dipping are well embedded in the coating whereas the ones on the right, sprinkled after 14 seconds, sit loosely on the surface and fall off if rubbed.

It was found that the process is workable by applying the particles between 8 to 9 seconds after removing the bar from the dip tank. Under this condition, the dripping into the particulate collection hopper and the resulting agglomeration is still acceptable for production purposes.

Example 3—Adhesion Properties and Reduction of Dripping with Air Knives

This example, demonstrated in table 3, shows a preferred position of the air knife in the assembly according to the invention which results in a suitable reduction of dripping and adhesion of particles.

An air knife (0.15 mm nozzle gap width, pointing straight up, oriented at 90 degrees to the direction of product flow, 15 mm from the product surface and operating at 20 psi) is located at 3 different positions from the point of removal of the bar from the dip tank.

The line moves with a speed of 240 mm per second.

The amount of coating dripping after the air knife until solidification is recorded. When the air knife is located to act on the bar 1.9 seconds after it is removal from the dip tank, a clearly higher amount of drip from this point forward was observed compared to a position of 2.7 and 3.7 sec. Furthermore, it was found that there is only little difference between 2.7 and 3.7 seconds. Hence, preferred positions of the air knife are 2.7 seconds or later.

TABLE 3

| Position of air knife (seconds after product is removed from dip tank) | Amount of dripping (g/bar) after air knife till solidification of coating |
|---|---|
| 1.9 | 6.9 |
| 2.7 | 1.3 |
| 3.7 | 1.1 |

As mentioned, it was observed that after the air blowing step, there is a period where the dripping stops completely for a period of time, then resumes until solidification.

This effect is demonstrated in table 1—column 2. After the dip tank, a bar passed over an air knife at 2.7 seconds after exiting the dip tank. The removal of coating by the air knife causes a sudden drop of the coating weight adhering to the bar. Further, and importantly, there is no change in weight for at least 1.4 sec. A minor amount of dripping re-appears then till the last drop falls at 18.1 sec.

It was found that the time period right after the air blow step at 2.7 sec, when no dripping occurs for at least 1.4 sec, is well suited to apply particles. Since there is no dripping during this time window, there will be no agglomeration in the particles collection hopper of the particle supply system, when it is located within this time window. Dripping occurring after this time happens outside the particulate collection hopper and has no negative impact.

This is summarized in FIG. 3, graphically showing the coating weight and particle adhesion over time in seconds after the dipping of an ice cream stick. The upper graph shows the sudden drop in coating weight due to the blow-off step, creating a drip-free "time-window". The lower graph, showing the particle adhesion over time indicated that during that time window, the adhesion properties of the coating are well suited for applying the particles. The time window is highlighted as a grey area.

Figure 5:
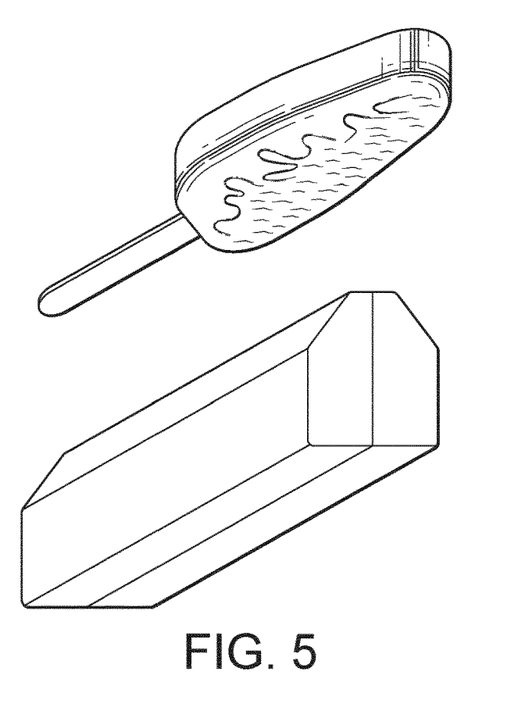
FIG. 5 schematically shows the removal of excess coating material from the underside of a bar by means of an air knife.
Figure 6:
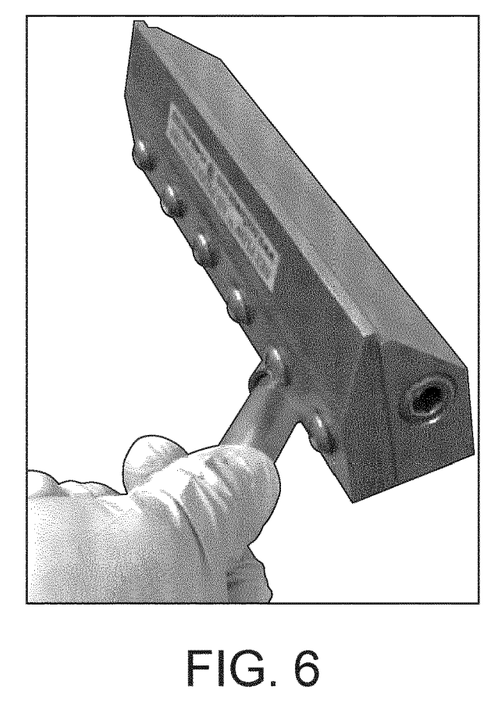
FIG. 6 displays a typical air knife.
Figure 7:
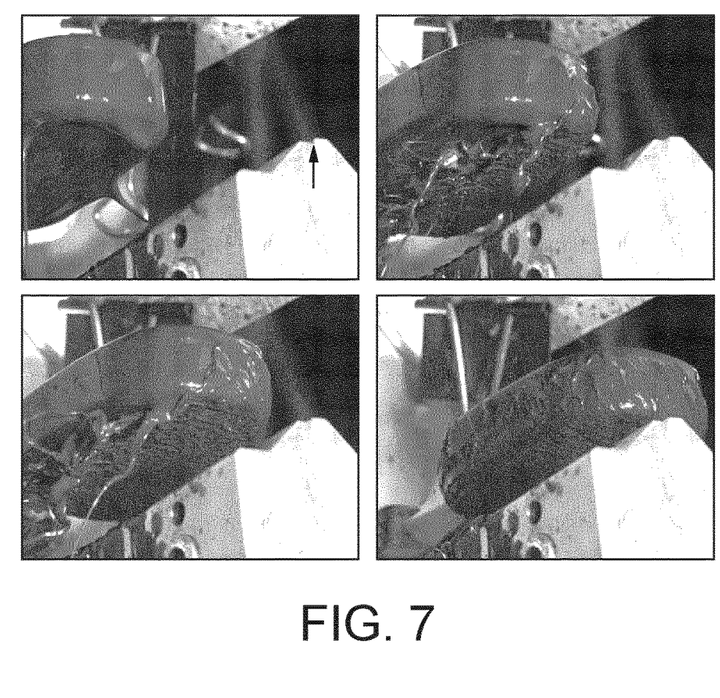
FIG. 7 shows the progressive removal of coating from the underside of a coated bar by an air knife located beneath the bar. The bar passes over the air knife from left to right and liquid coating is blown away. The arrow shows the position of the air knife nozzle.

FIG. 5 schematically demonstrates how the air blowing from the air knife blows off the liquid from the underside of the bar, which is moving from left to right. This is further displayed in FIG. 7. A dripping bar (upper left) moving from left to right, approaches the air knife. Once the air hits the product, liquid coating is pushed to the left, leaving a clean surface without drops but with a wave-like pattern (upper right and lower left and right).

The air blowing step thus allows to greatly reduce or eliminate coating from dripping into the collection hopper of the particle supply system and causing lumping of the particles, while making possible a good adhesion of the particles on the coating.

Example 4—Description of Product Manufacturing Trial

An extruded ice cream bar with a weight of 56 g and an overrun of 40% is produced on a single-lane extrusion line. The bar is moving along a conveyor chain at a speed of 240 mm per second and dipped into a coating of 48% fat content with 50% of the fat being cocoa butter and 50% being coconut oil. The coating temperature is 41 degrees Celsius and the dipping time is 1 second. 2.7 seconds after removing the bar from the dip tank, the bar passes over an air knife. The air knife is positioned beneath the product path, pointing upwards vertically, with an angle of 90 degrees versus the direction of product movement. The air knife has a nozzle gap of 0.15 mm and operates at 20 psi. The distance of the air knife to the underside side of the product is 15 mm. One second after the product has passed the air knife, a layer of particles is sprinkled onto the bar from a height of 10 cm. The particles consist of spherical rice crisps with a fat based coating.

Two seconds after applying the particles, the product passes under a coating line applicator which applies lines of acompound coating. The product is held in a horizontal position for another 7 seconds, then lowered to a vertical position. The product is then transferred towards the wrapping machine and wrapped.

The resulting product consists of the following elements and has the visual appearance of a product made manually.

The frozen confectionery product consist of:

|   |   |
|---|---|
| Ice cream bar | 56 g |
| Coating | 18 g |
| Particles | 8 g |
| Drizzle lines | 3 g |

The upper side of finished product is shown in FIG. 2a. FIG. 2b shows the underside of the product which has been subjected to the air knife. This step has created a wave-like pattern on the coating.

It should be understood that there are various changes and modifications to the presently preferred embodiments described herein which will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An apparatus for decorating frozen confectionery on sticks, the apparatus comprising:
    a coating station configured for applying coating material onto the frozen confectionery,
    a particle dispensing station configured for applying particles onto the frozen confectionery,
    a conveyor configured for moving the frozen confectionery past the coating station and the particle dispensing station, the conveyor comprising:
        gripping means arranged on the conveyor, the gripping means having a product attached position and an opened position configured for gripping and releasing a stick of the frozen confectionery, and
        guides configured for moving the gripping means with the frozen confectionery between a vertical position and a horizontal position, and
    coating removal means configured for removing the coating material on one side of the frozen confectionery, the coating removal means are positioned after the coating station in a direction of movement of the conveyor, and wherein the particle dispensing station is positioned after the coating removal means, and wherein the gripping means are arranged to hold the frozen confectionery in the horizontal position when passing the particle dispensing station.

2. The apparatus according to claim 1, wherein in the coating removal means comprises airflow means adapted to partially remove the coating material from the one side of the frozen confectionery.

3. The apparatus according to claim 2, wherein the airflow means are in the form of air knife, knives, and/or curtain.

4. The apparatus according to claim 2, wherein the airflow means are positioned so that a direction of a flow of air of the airflow means, based upon a top down view onto the frozen confectionary, is perpendicular to the direction of the movement of the products or with an angle of up to 60 degrees to either side of the movement of the conveyor as measured from a position perpendicular to the direction of the movement of the product.

5. The apparatus according to claim 2, wherein the air flow means is positioned so that the air flow means points vertically straight up onto an underside of the product or with an angle up to 45 degrees from the vertical position to either side of the product.

6. The apparatus according to claim 2, wherein apparatus comprises a heating device configured for heating an airflow from the coating removal means.

7. The apparatus according to claim 1, wherein the conveyor comprising the gripping means is arranged perpendicular to the direction of the movement of the conveyor.

8. The apparatus according to claim 1, wherein the coating removal means positioned after the coating station are at a position beside or beneath the conveyor.

9. The apparatus according to claim 1, wherein the coating removal means comprises a mechanical scraper.

10. The apparatus according to claim 1, wherein the particle dispensing station comprises a particulate dispensing hopper.

11. The apparatus according to claim 1, wherein the apparatus further comprises a particle supply system configured for collecting particles not attached to the frozen confectionery coating and conveying means to return collected particles back to the dispensing station.

12. The apparatus according to claim 1, wherein the apparatus further comprises a coating line applicator.

13. A method for manufacturing decorated frozen confectionery on sticks, the method comprising:
    providing the apparatus according to claim 1,
    attaching the frozen confectionery by the stick with the gripping means on the conveyor,
    moving the frozen confectionery past the coating station while applying a coating,
    bringing the frozen confectionery to a horizontal position,
    removing liquid coating with the coating removal means from the one side of the frozen confectionery,
    moving the frozen confectionery past the particle dispensing station while adding particles to the upper surface of the frozen confectionery,
    cooling and
    releasing the gripping means and the frozen confectionery.

14. The method according to claim 13, wherein the coating is applied by dipping, spraying, or showering.

15. The method according to claim 13, wherein lines are added with a coating line applicator after the frozen confectionery has passed the particle dispensing station.

16. The apparatus according to claim 5, wherein the airflow means is positioned so that the flow of air points onto the underside of the product with an angle up to 20 degrees into a direction opposite to the direction of movement of the conveyor of the product.

17. The apparatus according to claim 12, wherein the coating line applicator is positioned after the particle dispenser in the direction of the movement of the conveyor.

* * * * *